(12) United States Patent
Han et al.

(10) Patent No.: US 7,868,094 B2
(45) Date of Patent: Jan. 11, 2011

(54) ADHESIVE COMPOSITION

(75) Inventors: Qiwen Han, East Brunswick, NJ (US); Frank Joseph Swiezkowski, Hamilton Square, NJ (US); Tianjian Huang, Hillsborough, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 246 days.

(21) Appl. No.: 11/284,241

(22) Filed: Nov. 21, 2005

(65) Prior Publication Data

US 2007/0117927 A1 May 24, 2007

(51) Int. Cl.
*C08F 8/00* (2006.01)
(52) U.S. Cl. .................. 525/218; 525/191; 525/222; 524/524; 524/538
(58) Field of Classification Search ............ 524/524, 524/538; 525/218, 222, 191
See application file for complete search history.

(56) References Cited

U.S. PATENT DOCUMENTS

| 4,960,802 | A  | * | 10/1990 | DiStefano ............. 521/72 |
| 5,190,997 | A  | * | 3/1993  | Lindemann et al. ........... 524/44 |
| 6,794,001 | B2 | * | 9/2004  | Chen et al. ............... 428/40.1 |
| 6,872,278 | B2 | * | 3/2005  | Lehman et al. ............. 156/327 |
| 7,235,608 | B2 | * | 6/2007  | Hu et al. ................. 525/218 |
| 2004/0018332 | A1 | * | 1/2004 | Hu et al. ................. 428/60 |

FOREIGN PATENT DOCUMENTS

| GB | 2135903     | * | 9/1984  |
| JP | 05017730 A  | * | 1/1993  |
| JP | 05-311128   | * | 11/1993 |
| JP | 2002060712 A|   | 2/2002  |
| JP | 2003001741 A|   | 1/2003  |
| JP | 2005272774 A|   | 10/2005 |

* cited by examiner

*Primary Examiner*—Irina S Zemel
(74) *Attorney, Agent, or Firm*—Sun Hee Lehmann

(57) ABSTRACT

A foamable crosslinkable composition particularly useful as a foamed adhesive or coating.

12 Claims, No Drawings

ADHESIVE COMPOSITION

FIELD OF THE INVENTION

The invention relates to foamable compositions, more particularly foamed compositions including adhesives, binders and coating compositions, as well as articles, such as decorative laminates, manufactured using the foamed compositions of the invention.

BACKGROUND OF THE INVENTION

In today's competitive marketplace it is important to maintain manufacturing costs at a minimum. This includes reducing costs associated with the manufacture of the goods as well as with the packaging of the goods and the like. Packaging costs, of course, include the costs of the materials required to make the package (e.g., paper, plastic, adhesive and the like) and costs associated with packaging defects (e.g., materials that must be discarded due to unacceptable strength, appearance or the like).

Laminated products have largely replaced natural materials in the construction of furniture, cabinets, countertops, interior doors and the like, due in large part to the strength, durability, decorativeness and cost of these products. Such products are typically prepared by bonding a surface material to a core material using an adhesive, and application of heat and/or pressure. Interior doors and countertops, for example, are conventionally manufactured by bonding a hardboard door facing or other conventional surface material to a particleboard or other conventional frame or core material.

While liquid solvent-based adhesives and aqueous liquid adhesives have been used to bond substrate materials, these adhesives have a number of disadvantages associated with their use. Solvent-based adhesives pose environmental and health hazards and are difficult to handle. Aqueous liquid adhesives require significant drying times, require long set or cure times, and the water contained within them tends to swell surface and/or core materials leading to warpage.

Water-based adhesives are commonly used to manufacture paper, multi-wall and specialty bags. In the manufacture of bags, a water-based adhesive is generally applied to a substrate and then mated to another similar or dissimilar substrate to form a fold or multi-layered structure. While water-based adhesives have been used in the manufacture of bags, water-based adhesives require significant drying times and the water contained within them often causes the substrates to warp, wrinkle, curl or bend. A similar situation exists in non-paper laminating fields, such as decorative laminating. In these fields, higher bonding performance is often required, such as water resistance for exterior use of the final products.

There is a continuing need for improved adhesives and coating compositions that can be used to provide protective coatings or used to adhesive bond together laminated articles. The described invention addresses this need by providing coating compositions and adhesives that are high performance, safe, effective, and, in addition, provides substantial cost savings.

SUMMARY OF THE INVENTION

The invention provides one-part, foamable, crosslinkable adhesive composition.

One embodiment of the invention provides a foamable waterborne composition comprising a noncrosslinkable foamable polymer and a reactive crosslinkable polymer. Preferred embodiments will also comprise a second crosslinkable component, a coalescing agent and preferably also a crosslinking catalyst. One composition encompassed by the invention comprises an ethylene-vinyl acetate copolymer, an N-methylol acrylamide-vinyl acetate copolymer, a phenol formaldehyde resin, ⅓ basic aluminum chloride, and diethylene glycol monobutyl ether acetate.

Another embodiment of the invention is directed to foamed coatings and foamed adhesives. Such foamed coating and adhesive compositions are made by foaming to from about 20% by volume to about 60% per volume foamable compositions comprising at least a noncrosslinkable foamable copolymer and a reactive crosslinkable copolymer and, optionally, a second crosslinkable component, a coalescing agent and a crosslinking catalyst. One foamed composition encompassed by the invention comprises an ethylene vinyl acetate copolymer, an N-methylol acrylamide polyvinyl acetate copolymer, a phenolic resin, aluminum chloride, and diethylene glycol monobutyl ether acetate. The foamable compositions are more typically foamed to from about 35 to about 45% by volume.

Still other embodiments of the invention encompass articles of manufacture. The compositions may be used as a surface coating agent in applications requiring a low gloss surface, a heat/energy blocking surface or a sound absorbing surface. The compostions are also useful as an adhesive, both in converting and in product assembly applications.

DETAILED DESCRIPTION OF THE INVENTION

One-part, foamable, crosslinkable compositions are provided. It has been discovered that when the compositions are modified and mechanically agitated with air, these adhesives form highly stable, consistent foams that can be applied to a substrate without destroying the foam by mechanical sheering. Benefits of using the foamed adhesive of the invention include improved economics and performance, such as reduced penetration into substrates, reduced moisture and faster set times. It has been discovered that adding air bubbles to the adhesive significantly reduces moisture content. Faster drying times and a substantial reduction in incidence of warping and/or wrinkling encountered in prior art methods are possible. The foamed compositions are fast-setting have high green strength and provide a water-resistant adhesive/coating.

The foamable composition of the invention comprises at least one non-crosslinkable foamable polymer emulsion. This component provides foamability, foam stability and foam shear stability. Non-limiting examples include vinyl acetate copolymer emulsions; vinyl acetate copolymer emulsions, such as ethylene-vinyl acetate copolymer emulsions, vinyl acetate-maleic ester copolymer emulsions, vinyl acetate-acrylic copolymer emulsions, and vinyl acetate-versatate copolymer emulsions; ethylene-vinyl acetate-vinyl chloride copolymer emulsions; acrylic emulsions, such as styrene acrylic emulsions, and vinyl acrylic emulsions; butadiene copolymer emulsions, such as styrene-butadiene copolymer emulsions, and carboxylated butadiene copolymer emulsions; natural rubber emulsions; chloroprene homopolymer or copolymer emulsions; polyurethane dispersions; or other types of emulsions; or mixtures or combinations thereof.

The foamable composition of the invention will also comprise at least one crosslinkable or reactive polymer emulsion. This component provides reactivity and crosslinking ability, and provides both strength and water/chemical resistance. Non-limiting examples include functionalized polymer emulsions, including vinyl acetate polymer emulsions; vinyl acetate copolymer emulsions, such as vinyl-N-methylol acrylamide copolymer emulsions, ethylene-vinyl acetate copolymer emulsions, ethylene-vinyl acetate-N-methylol acrylamide copolymer emulsions, vinyl acetate-maleic ester copolymer emulsions, vinyl acetate-acrylic copolymer emulsions, and vinyl acetate-versatate copolymer emulsions; ethylene-vinyl acetate-vinyl chloride copolymer emulsions; acrylic emulsions, such as styrene acrylic emulsions, and vinyl acrylic emulsions; butadiene copolymer emulsions, such as styrene-butadiene copolymer emulsions, and carboxylated butadiene copolymer emulsions; natural rubber emulsions; chloroprene homopolymer or copolymer emulsions; polyurethane dispersions; or other types of emulsions; or mixtures or combinations thereof. Functional groups on the polymers include: carboxylic acid, hydroxyl, amine, carbonyl, N-methylol amide, aldehyde, thiol, or other chemical groups, or combinations thereof.

Particularly preferred crosslinking polymers are N-methylol acrylamide containing polymers synthesized from vinyl acetate and N-methylol acrylamide (NMA). Other copolymers in the NMA family that can be used to prepare acetate copolymers include N-methylolmethacrylamide (NMMA), N-(alkoxymethyl)-acrylamides, N-(alkoxymethyl)-methacrylamides and esters of N-methylol(meth)acrylamide.

The foamable composition of the invention will also preferably comprise at least one catalyst that accelerates crosslinking reactions, and/or bridges polymer chains. Non-limiting examples include acids, such as sulfuric acid; phosphoric acid; nitric acid; chromium nitrate; aluminum nitrate; aluminum sulfate; aluminum chloride; ⅓ basic aluminum chloride; ⅔ basic aluminum chloride; sulfonic acids, such as p-toluene sulfonic acid; organinc acids; amines; hydrides; aldehydes; isocyanates; or aziridines; or mixtures or combinations thereof. In the absence of a catalyst, heat may be applied to facilitate crosslinking.

Preferred embodiments, the foamable composition of the invention will also preferably comprise auxiliary crosslinkable component(s). Such additional crosslinkable components introduce different crosslinking networks, increases total crosslinking density, and/or modifying final film property. Particularly preferred are formaldehyde-containing resins such as phenol-formaldehyde resins, resorcinol-formaldehyde resins, urea-formaldehyde resins, or melamine-formaldehyde resins, or mixtures or combinations thereof.

The foamable composition of the invention will also preferably comprise coalescing agent(s) in order to facilitate dry film formation, improve substrate surface wetting, and/or modify final film property. Non-limiting examples include cosolvents, such as diethylene glycol monobutyl ether acetate, 2,2,4-trimethylpentanediol-1,3-monoisobutyrate, ethylene glycol diacetate, ethylene glycol phenol ether, diethylene glycol phenol ether, propylene glycol ether, dipropylene glycol ether, or tripropylene glycol n-butyl ether; dibenzoates plasticizers, such as 2,2'-oxybis(ethanol)dibenzoate, 3,3'-oxydi-1-propanol dibenzoate; sulfonated plasticizers, such as lignosulfonates, or melamine sulfonates; bis(2-butoxyethyl) adipate, 2-butoxyethyl oleate, butyl tallate, diisodecyl adipate, diisodecyl glutarate, diisooctyl dodecanedioate, 2-hydroxyethyl stearate, isooctyl tallate, poly(ethylene glycol) acrylate, poly(ethylene glycol) bis(2-ethylhexanoate) poly(ethylene glycol) dibenzoate, poly(ethylene glycol) dioleate, poly(ethylene glycol) monooleate, sucrose benzoate, tri(ethylene glycol) bis(2-ethylhexanoate), 2,2,4-trimethyl-1,3-pentanediol dibenzoate, or amine hydrocholorides; or mixtures or combinations thereof.

The foamable composition of the invention will also preferably comprise a preservative to reduce contamination due to, e.g., bioactive agents. Non-limiting examples of useful preservatives include isothiazolines, such as 5-chloro-2-methyl-isothiazolin-3-one; 2-methyl-2-isothiazolin-3-one; benzoates; thiabendazole; dibromodicyanobutane; formaldehyde; phenols; fluorides; copper sulfate; zinc sulfate; or amine hydrocholorides; or mixtures or combinations thereof.

Other components typical of adhesive compositions may be added to the foamable compositions. Said additives include, but are not limited to, plasticizers, waxes, tackifiers, fillers, dyes, pigments, UV indicators, and other additives commonly used in the art.

Suitable fillers are those fillers known in the art as adhesives fillers and include polysaccharides, calcium carbonate, clay, mica, nut shell flours, silica, talc and wood flour.

The amount of each component is not limiting to the practice of the invention. Composition will typically comprise from about 20 to about 98 wt % of a noncrosslinkable copolymer, from about 1 to about 70 wt % of a crosslinkable copolymer, from about 0.5 to about 30 wt % of a second crosslinkable component, from about 0.1 to about 10 wt % of a crosslinking catalyst and from about 0.1 to about 10 wt % of a coalescing agent. Preferred for practice are compositions that comprise from about 70 to about 90 wt % of a non-crosslinkable copolymer, from about 10 to about 20 wt % of a crosslinkable copolymer, from about 0.5 to about 4 wt % of a second crosslinkable component, from about 0.1 to about 2 wt % of a crosslinking catalyst and from about 0.1 to about 2 wt % of a coalescing agent. A particularly preferred embodiment comprises comprising ethylene vinyl acetate copolymer, N-methylol acrylamide polyvinyl acetate copolymer, aluminum chloride, a phenolic resin and diethylene glycol monobutyl ether acetate.

The compositions of the invention will advantageously be used in the foamed state to coat a substrate surface or to bond one substrate to a second substrate. The composition can be used to bond identical substrates to one another or can be used to bond one substrate to a second different substrate. The adhesive composition of the invention is useful for bonding articles composed of a wide variety of porous substrates (materials). Substrates that can be bonded together include paper and paperboard substrates, plastic coated paper, plastic, styrofoam, cured and optionally foamed polyurethane, polyisocyanurate and/or phenolic resin, wood and wood composites, and high pressure laminates. It is to understood that term "wood" is being used generically and encompasses all types of wood as well as wood-containing composites, engineered wood, particle board and the like.

The foamable adhesive composition of the invention is foamed by the addition of energy, by means known in the art such as, but not limited to, by mechanical and/or chemical means. Air or other gases are added to the foamable adhesive composition along with the addition of said energy to produce a stable, consistent foamed adhesive. Preferably air is used to produce the foamed adhesive. The adhesive foam may be produced by mechanical means such as mechanical stirring or agitation, introduction of gases or by chemical means.

The amount of air dispersed in the adhesive can vary depending on the particular formulation, but will generally be from about 10% (by volume) up to about 50% (by volume) or greater. In the practice of the invention, the composition will typically be foamed to from about 20% by volume to about 60% per volume, more typically from about 35 to about 45% by volume.

The adhesive product can be applied to a substrate by a variety of methods including coating or spraying in an amount sufficient to cause the substrate to which it is applied to adhere to another substrate. The adhesive is applied to a substrate while in its liquid state and allowed to dry to harden the adhesive layer. The adhesive can be allowed to air dry or can be dried by other conventional means, such as with the use of ovens or hot press. In the practice of the invention, pressure is typically applied for periods of less than about 110 seconds.

Crosslinking occurs during drying and/or heating of the applied adhesive.

The adhesive may be applied by any method known in the art. Typically the core material and/or the surfacing material is coated with up to about 10 wet mils of foamed adhesive. Preferably, the foamed adhesive is applied using a roll coater, also referred to in the art as a glue spreader. The surfacing material substrate is brought in contact with the core material substrate to form the manufactured article. The articles may, if desired, be stacked and cold pressed.

Adhesives useful in the practice of the invention will generally exhibit greater than 50% fiber tear, more typically greater than 75% fiber tear, even more preferred for use are adhesives exhibiting complete substrate failure (100% fiber tear) with no cohesive failure.

The foamed compositions of the invention may be used to surface coat articles to provide low gloss, acoustical insulation and heat or energy blocking properties.

The foamed composition may also be used as a converting adhesive. The foamed adhesives are safe and effective for use in the manufacture of packaging materials, in particular bags including multi-ply bags, that can provide a substantial savings in terms of cost and, in addition, a reduction in packaging defects. Multi-ply packages for e.g., housing materials will generally comprise at least one side wall, said side wall comprising at least an inner ply and an outer ply, wherein a first ply is bonded to a second ply with the foamed adhesive of the invention. In a preferred embodiment, at least one of said substrates comprises a plastic material. In a particularly preferred embodiment, one substrate is plastic and one substrate is a paper stock material.

While the adhesive finds particular use as a laminating adhesive to bond together the plies of multi-ply packaging materials such as multi-ply bags, the adhesive may also be used to bond together the lap seams and/or to secure a handle component to the bag. The laminates may be made totally of paper or partially of paper. The invention encompasses paper laminates, plastic/paper laminates. The adhesive may be applied on one or both sides, and may be coated on the side to be laminated. Included are plastic/paper laminates and plastic/paper/plastic laminates.

The foamed adhesive can also be used for single face laminating, bulk-box laminating, tube and core winding, paper-to-paper laminating, ceiling tiles, and to bond foam to paper or foam to board such as in the production of artist mat board.

The foamed composition can also be used as a product assembly adhesive in HPL laminating, in wood-to-non-wood face laminating, in door manufacturing, in paper and vinyl to foam, gypsum and wood composites, drawer wrap, papers or foils to wood composites, such as OSB, in panel manufacturing, veneering and in the manufacture of insulation.

The foamed adhesive when used in the practice of the invention has sufficient wet bond strength for holding sheets of high pressure laminate (HPL) to sheets of particle board as these panels are moved through a heating and pressing zone. The adhesives of the invention may be used to prepare various articles of manufacture, but are particularly useful in bonding high pressure laminates to particle board. Articles of manufacture that can be made in accordance with the invention include, but are not limited to, countertops, office partitions, architectural doors, flipper doors, and the like.

The preparation of decorative, high pressure laminates is well known to those skilled in the art, and need not be described in detail herein. Laminates can be prepared from (1) a rigid substrate, (2) a melamine resin impregnated decorative sheet, and, in some cases (3) a melamine resin impregnated overlay sheet. In such decorative laminates, the rigid substrate may consist of any suitable material, such as particle board, a resin-binded wood fiberboard, a plurality of phenolic resin-impregnated sheet of e.g., Kraft paper, etc. The decor sheets are typically made of very heavy paper comprised of cellulose fibers and an opacifying pigment such as titanium oxide. The decor sheets are printed upon with designs to create the decorative pattern of the laminate. The overlay sheets are clear cellulose sheet which act as a protective layer over the decor sheet. The overlay sheets are used optionally depending on the need for protective surfaces.

These sheets are heated under high pressure to form a single component that can be incorporated into furniture, used on countertops or flooring, etc. In a typical process for preparing laminates, the sheets are saturated with the appropriate thermoset resins (e.g., melamine or phenolic resin). The amount of resin incorporated into these laminates typically varies from 30% to 80% based on the weight of the total laminate, and depends on the type of application and the type of materials used to make the laminate. After the paper is impregnated with the resin, it is dried to a suitable volatile content and the sheets are then assembled into a laminate between two pressing plates. The laminate is then formed in this fashion under a specific pressure (generally 1000-2000 psi) and temperature (generally from about 250° to about 350° F.) for periods of 5 to 45 minutes. The laminate made in this manner must then pass several physical tests, including post-formability and resistance to boiling water.

The terms "wood composite" and "particle board" are used interchangeably through out this disclosure. These terms are meant to encompass chipboard, particleboard, medium density fiberboard, high density fiberboard, oriented strandboard, hardboard, hardwood plywood, veneer core plywood, isocyanate or phenolic impregnated strawboard, and wood composites made from woodfiber and polymers, such as recycled polyethylene.

The adhesives of the invention are also particularly useful in bonding door skins to frame or core materials such as particleboard. The adhesives of the invention may be used to prepare various articles of manufacture, but are particularly useful in bonding hard wood veneers to particleboard cores in the manufacture of doors. The adhesive of the invention is particularly advantageous when used in the manufacture of flush doors. Flush doors are also alternatively referred to herein as flat-skinned doors or as interior or passage doors. Both solid and "hollow" core doors can be manufactured using the foamed adhesive of the invention. The doors of the invention comprise a core sandwiched between two external flush panels adhesively secured to the core. The core may be solid material or, as in the case of "hollow" core doors, comprise perimeter vertical and horizontal frame members. Included within the definition of a solid core door are "honeycomb" core doors. Hollow core doors are known in the art. A typical hollow core door includes a perimeter frame with vertically extending stiles and top and bottom rails, with a pair of opposing door skins secured to the frame member. Hollow core doors according to the invention comprise a door frame including first and second stiles that are oriented substantially parallel to one another, a top rail member and a bottom rail member; first and second door skins, each of said door skins being substantially planar in shape; said first door skin affixed to a first side of said door frame and said second door skin affixed to a second side of said door frame. It will be appreciated that the first and second door skin material can be identical or different. Hollow core doors manufactured in accordance with the invention are particularly advantageous from the standpoint of ease of handling and cost of transportation since such doors typically weigh less than solid core doors. In addition to hardwood, surfacing or door skin materials include decorative laminates such as particle board, a resin-binded wood fiberboard, multiple sheets of phenolic resin-impregnated sheets of e.g., Kraft paper, etc. and the like. The thickness of the surfacing material used in the practice of the invention is not critical, but will generally range in thickness from about 3/16 inch to about 3/8 inch.

The invention is further illustrated by the following non-limiting example.

EXAMPLE

Adhesive sample preparation and testing methods were performed using the following procedures:

Formulation Preparation

Adhesive formulations A and B having the formula show in Table 1 were prepared in a beaker equipped with a stirring blade. The EVA emulsion was added into the beaker and agitation begun at 60 RPM. The catalyst was added and mixed for 20 minutes. The PVAc-NMA emulsion and preservative (Kathon LX-1.5, manufactured by Rohm And Haas Company) were then added. After mixing for 20 minutes, the agitation speed was increased to 80 RPM, and then the phenol formaldehyde resin was added (available from Ashland under the tradename Arofene 72155-W-55). After 20 minutes of agitation, diethylene glycol monobutyl ether acetate was added. After 20 minutes of mixing, agitation was stopped and the formulation transferred into sealed bottles for storage.

Foaming Process

A foamed formulation was made by blending air into the unfoamed formulation by using an Oakes Bench-Top Continuous Foamer/Mixer (Model#: 2MTIA, manufactured by E.T. Oakes Corporation). The density of the foamed and unfoamed formulations were measured using a weight-per-gallon cup (manufactured by BYK-Chemie USA Inc.). The "foam level" is determined by the ratio of density difference between unfoamed and foamed formulations and the density of unfoamed formulation.

Testing Panel Preparation

Adhesive was applied on both sides of a core substrate (styrofoam) using a roll coater. Application level: 9-10 grams/sq ft for an unfoamed adhesive. Face liners made of plastic saturated paper sheets were applied to both sides of the coated core substrate to make a face-core-face assembly. The assembly was then placed in a hot press (20 psi, 155° F.) for 110 seconds. The green strength was measured by peeling the liner from the core beginning 1 min after the hot press at a 1 min interval. A knife blade was inserted between the core and a liner to help peel the liner off. Substrate tear percentage was read and recorded. The "set time" is defined as the time when 100% deep core tear is observed.

Test Procedure

Three to five 3-inch-by-1-inch specimens were cut from various parts of a testing panel. A vacuum-pressure soak test was conducted on the specimens. The soak procedure was performed in accordance with ASTM D 5751-99. After the specimens were removed from the soak vessel, they were tested while wet for adhesive bonding. A knife blade was inserted between the core and a liner to help peel the liner off. Substrate tear percentage (substrate failure) was read and recorded. Results are shown in Table 2.

TABLE 1

|  | Sample A (wt %) | Sample B (wt %) |
| --- | --- | --- |
| EVA emulsion | 83 | 83 |
| PVAc-NMA emulsion | 14 | 14 |
| 1/3 Basic aluminum chloride | 0.56 | 0.57 |
| Kathon LX-1.5 | 0.02 | 0.02 |
| Phenol formaldehyde resin | 2 | 2 |
| Diethylene glycol monobutyl ether acetate | 0.74 | 0.50 |

TABLE 2

|  | Sample A | Sample B |
| --- | --- | --- |
| Foam level, % | 41.2 | 40.3 |
| Coating weight reduction | 26 | 32 |
| Set time—unfoamed, min | 2 | 2 |
| Set time—foamed, min | 1 | <1 |
| Substrate failure in vacuum-pressure soak test, % | 100 | 100 |

The invention claimed is:

1. A foamed one-part waterborne adhesive or coating composition comprising a noncrosslinkable polymer, a reactive crosslinkable polymer, at least a second crosslinkable component and a crosslinking catalyst, and wherein said catalyst is selected from the group consisting of 1/3 basic aluminum chloride, 2/3 basic aluminum chloride or mixtures thereof.

2. The composition of claim 1 wherein noncrosslinkable polymer is an ethylene-vinyl acetate copolymer and the reactive crosslinkable copolymer is a vinyl acetate-N-methylol acrylamide copolymer.

3. The composition of claim 1 which is foamed to from about 20% by volume to about 60% per volume.

4. The composition of claim 3 which is foamed to from about 35% to about 45% by volume.

5. The composition of claim 1 that is crosslinked.

6. A laminate comprising the composition of claim 3.

7. The laminate of claim 6 wherein the composition is located between a decorative layer and a core layer.

8. The laminate of claim 7 wherein said decorative layer is paper, plastic, or paperboard and said core is styrofoam.

9. The laminate of claim 7 wherein said decorative layer is a thermosetting impregnated cellulosic material.

10. The laminate of claim 6 wherein the composition is crosslinked.

11. A substrate comprising the composition of claim 5.

12. A substrate surface that has been coated with the composition of claim 1, and the composition has been allowed to dry to crosslink and harden the composition.

* * * * *